Figure 1:
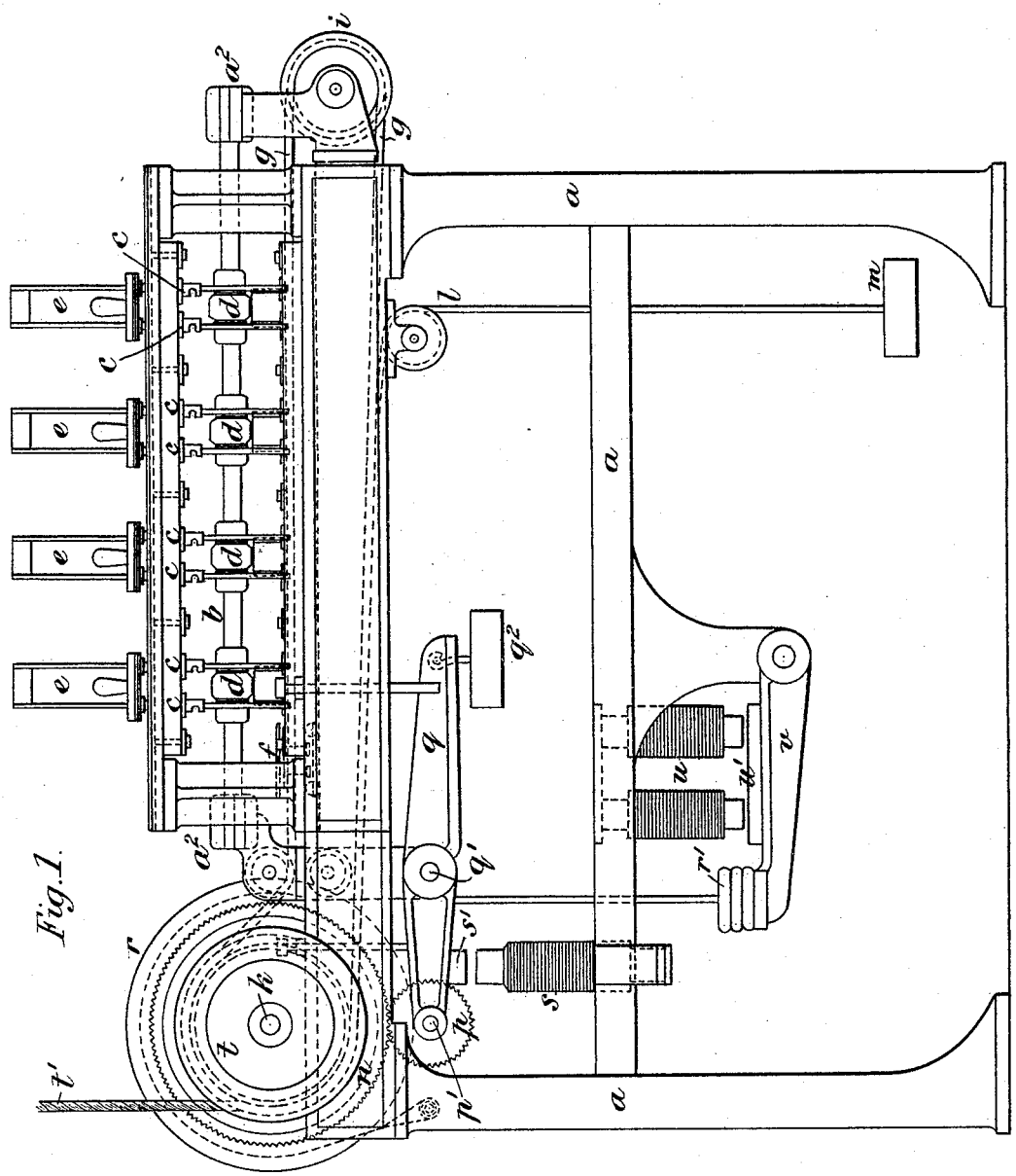

(No Model.) 7 Sheets—Sheet 1.

T. TOMLINSON.
APPARATUS FOR DISTRIBUTION OF ELECTRICITY.

No. 487,356. Patented Dec. 6, 1892.

Witnesses
B. W. Miller
C. M. Brooke.

Inventor
Thomas Tomlinson
By his Attorneys,
Baldwin, Davidson & Wight.

(No Model.)  7 Sheets—Sheet 2.

T. TOMLINSON.
APPARATUS FOR DISTRIBUTION OF ELECTRICITY.

No. 487,356. Patented Dec. 6, 1892.

Witnesses.
B. W. Miller
C. W. Brooke

Inventor:
Thomas Tomlinson,
By his Attorneys,
Baldwin, Davidson & Wight (No Model.) 7 Sheets—Sheet 3.

T. TOMLINSON.
APPARATUS FOR DISTRIBUTION OF ELECTRICITY.

No. 487,356. Patented Dec. 6, 1892.

(No Model.) 7 Sheets—Sheet 4.

T. TOMLINSON.
APPARATUS FOR DISTRIBUTION OF ELECTRICITY.

No. 487,356. Patented Dec. 6, 1892.

Witnesses
B. W. Miller.
C. W. Brooke.

Inventor
Thomas Tomlinson,
By his Attorneys,
Baldwin Davidson & Wight (No Model.) 7 Sheets—Sheet 5.

T. TOMLINSON.
APPARATUS FOR DISTRIBUTION OF ELECTRICITY.

No. 487,356. Patented Dec. 6, 1892.

Witnesses
B. W. Miller
F. W. Brooke

Inventor
Thomas Tomlinson,
By his Attorneys,
Baldwin, Davidson & Wight (No Model.) 7 Sheets—Sheet 6.
T. TOMLINSON.
APPARATUS FOR DISTRIBUTION OF ELECTRICITY.
No. 487,356. Patented Dec. 6, 1892.
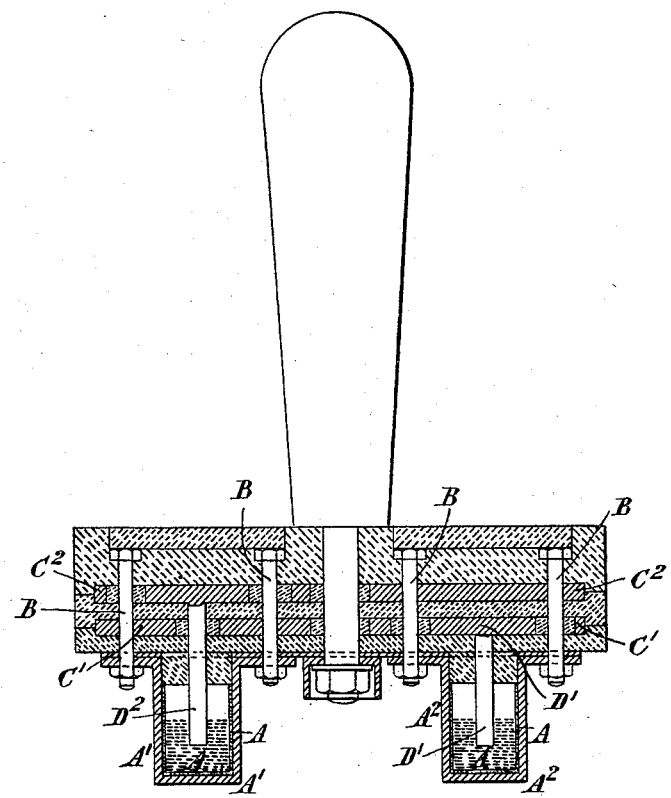
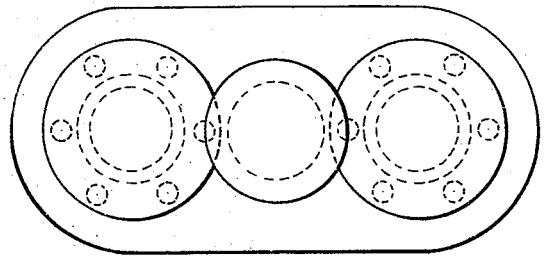

UNITED STATES PATENT OFFICE.

THOMAS TOMLINSON, OF LONDON, ENGLAND.

APPARATUS FOR DISTRIBUTION OF ELECTRICITY.

SPECIFICATION forming part of Letters Patent No. 487,356, dated December 6, 1892.

Application filed May 25, 1891. Serial No. 394,045. (No model.)

*To all whom it may concern:*

Be it known that I, THOMAS TOMLINSON, engineer, a subject of the Queen of Great Britain, residing at Lynton, Durham Road, Raynes Park, London, in the county of Surrey, England, have invented certain new and useful Improvements in the Distribution of Electricity and in the Apparatus Employed Therein, of which the following is a specification.

My invention particularly relates to systems in which transformers are used, though it may be employed wherever it may be necessary to insert and take out units of electrical apparatus under similar conditions. A sufficient number of transformers have to be provided to deal with the maximum load, and there are long periods in each day when the transformer capacity is greatly in excess of the requirements of the district or consumer, and during this time, whether lamps are connected to the secondary or not, there is waste of current in the primaries. I provide apparatus to be attached to groups of transformers at sub-stations or elsewhere for the purpose of disconnecting some of the transformers in each sub-station when the load on the secondary diminishes and for replacing them as it increases. This apparatus is so arranged as not to require the presence of an attendant at the sub-station or place where the transformers are situated. It is essential in such an apparatus that no possible failure should occur in replacing transformers, as such a failure would cause the burning out of the transformers already connected or the cutting off of the lights by blowing of the safety-flues. My apparatus is therefore so arranged that the mechanism for inserting the transformers is, so far as inserting the transformers is concerned, entirely independent of that for taking them out, and yet when it comes to taking out transformers absolutely controls the latter. I so arrange that the transformers are put into circuit by the descent of a weight, which is liberated by the action of an electro magnet. The transformers are taken out of circuit by the action of an electrically-controlled motor mechanism, which also when in action lifts the weight above mentioned. Thus notwithstanding any failure which may occur in the motive power the weight will always be in readiness to put in such transformers as are out as soon as the requirement arises. In place of a weight I may employ an equivalent, such as a metal spring; but the use of a weight, being simpler, is preferable. The motor mechanism may be of any convenient sort; but a train of wheels put in motion by the descent of a sufficiently-heavy weight is usually the most convenient. As a precaution against heating of the contact parts, I bridge them over with an instrument so contrived that as soon as a rise in temperature occurs the current is able to pass freely by the bridge, which, however, allows no current to pass so long as the parts remain cool.

In order that my invention may be fully understood, I will proceed to describe the drawings annexed.

Figure 2:
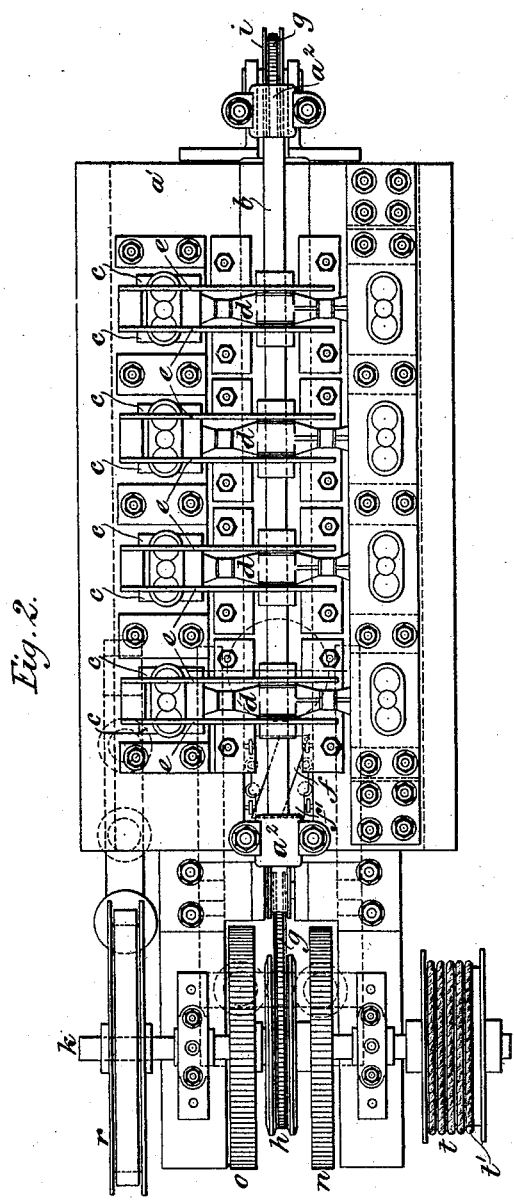
Figure 3:
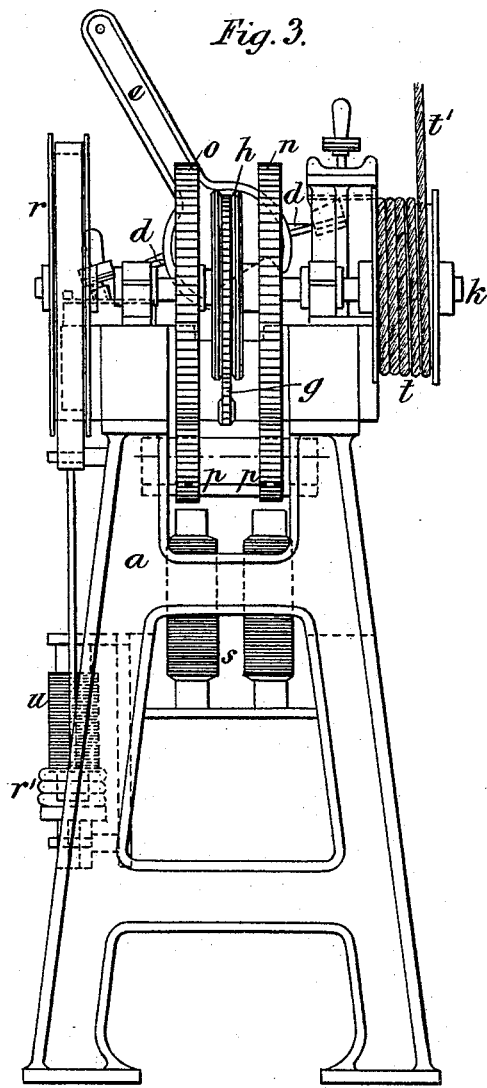
Figure 4:
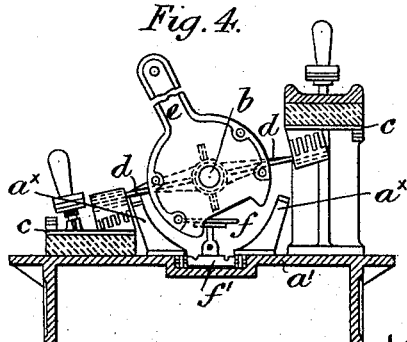
Figure 5:
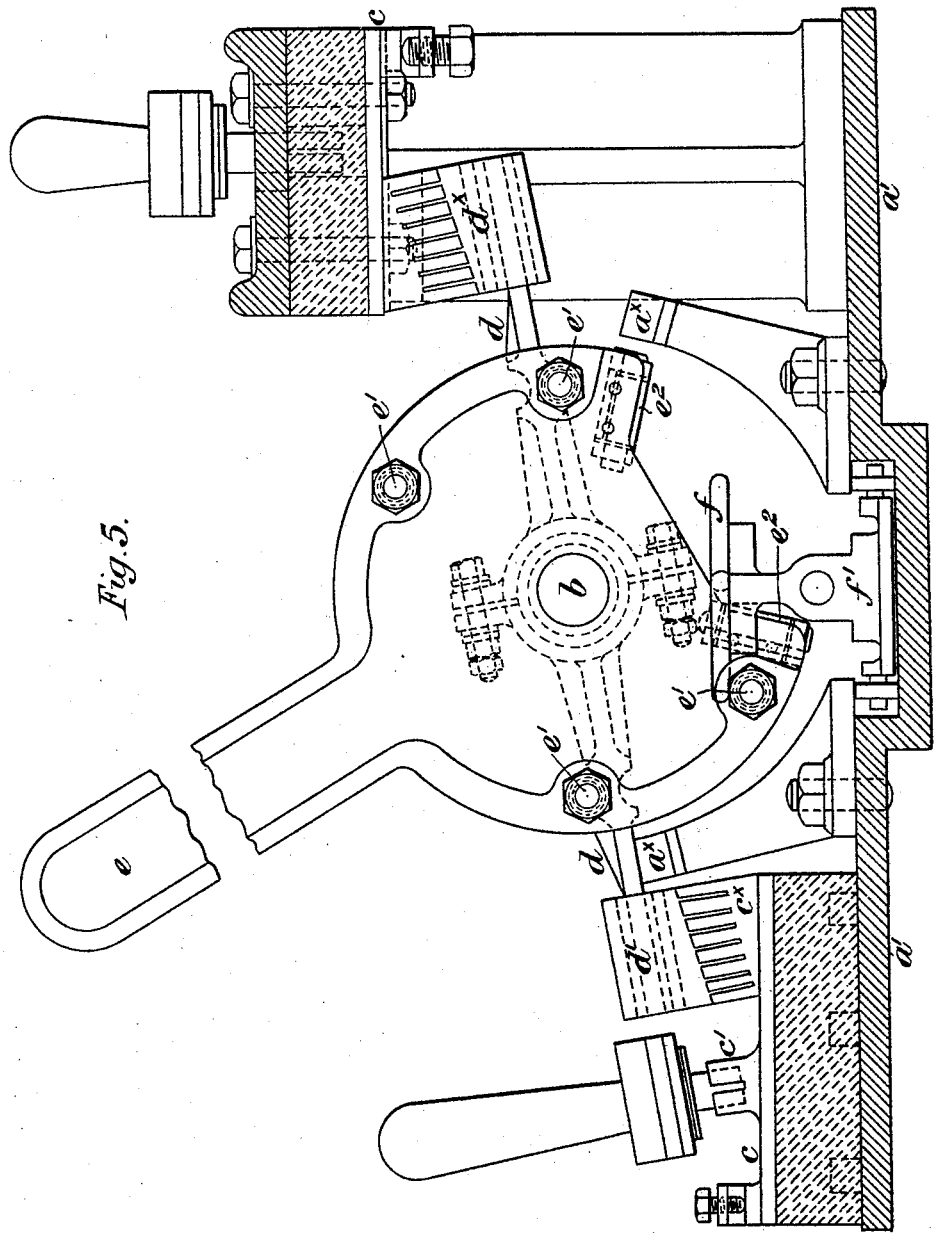
Figure 6:
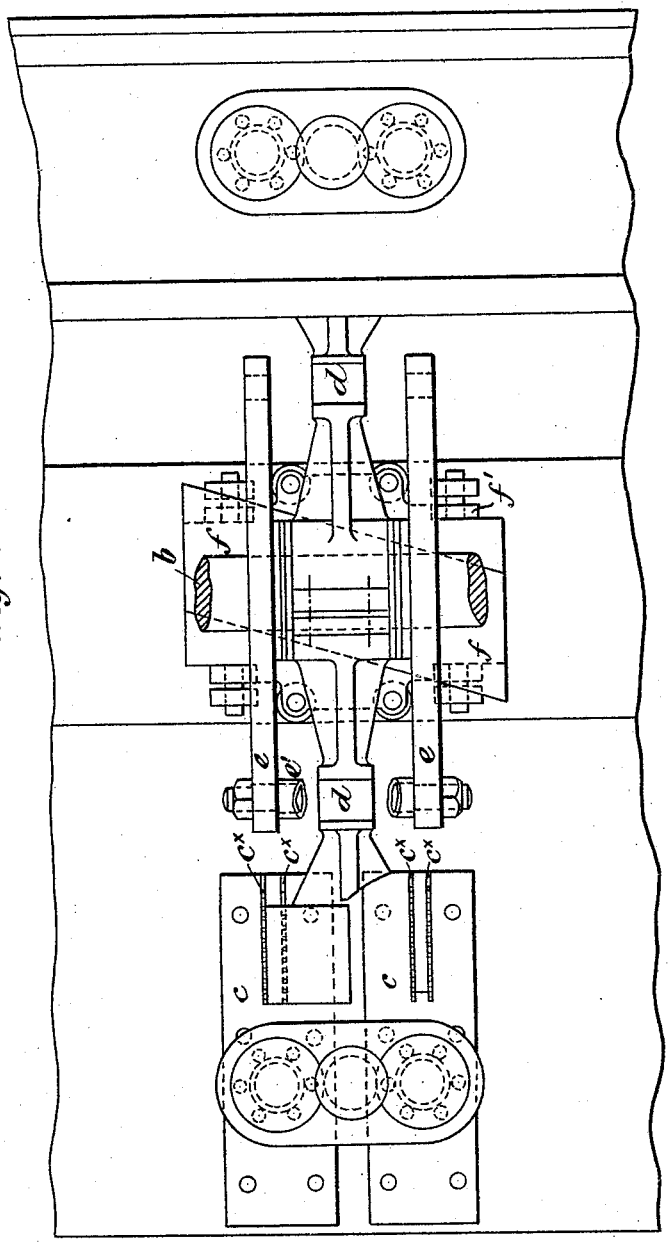
Figure 9:
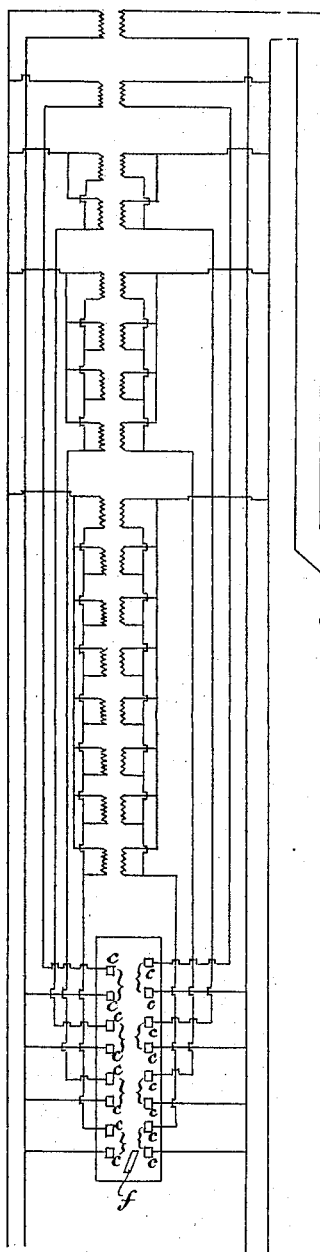

Figure 1 is an elevation of the apparatus which I employ to put transformers into and out of circuit. It can also be employed, when required, to connect and disconnect other units of electrical apparatus, as battery cells. Fig. 2 is a plan of the apparatus. Fig. 3 is an end elevation, and Fig. 4 is a transverse section, of the upper part. Fig. 5 is similar to Fig. 4, but is drawn to a larger scale. Fig. 6 is a plan, partly in section, of some of the parts seen in Fig. 5. Fig. 7 is a vertical section of the bridge appliance which when heating occurs establishes good electrical connection between the parts to which it is applied. Fig. 8 is a plan of the bridge appliance. Fig. 9 is a diagram showing some of the electrical connections.

$a\ a$ is the frame of the machine, and $a'$ is a table-surface forming part thereof. Over the face of the table and passing along it horizontally from end to end there is a bar $b$. It is supported at the ends by brackets $a^2\ a^2$. The circuit-wires of the transformers which it is required to put into and out of use from time to time are also brought to this table, and are there connected with carefully-insulated plates $c\ c$.

The apparatus shown by the drawings is adapted to control the connections of four sets of transformers, in addition to which there is a transformer or a set of transformers which always remains in circuit for work. This latter transformer or set of transformers has its primary coils always connected with the primary mains and its secondary coils always connected with the secondary mains or circuit-wires. The other transformers or sets of transformers when brought into use are coupled in parallel with the first; but when a transformer is out of use there is a gap or opening in its primary and another gap or opening in its secondary. In each case the gap or opening is the interval between a pair of plates $c\ c$. There are four pairs of plates $c$ on either side of the table, or sixteen plates in all. The plates on one side receive the primary wires and those on the other side the secondary wires, and these are made fast to the plates in such a way as to insure good permanent connections.

$d\ d\ d\ d$ are four circuit-closing arms mounted upon the bar $b$ in such manner as to be able to turn upon it. The arm in each case is so made that its extremities are effectually insulated the one from the other, and each extremity is double or forked and so made as to form a good electrical connection between two plates $c\ c$, which constitute a pair. As shown in the drawings, each arm terminates on one side in two downwardly-directed wedge-like ends $d'\ d'$, which are in one piece or in good electrical connection the one with the other, but for additional security are insulated from the rest of the arm. These wedge-pieces $d'\ d'$ when depressed each enter between a pair of metal combs $c^{\times}\ c^{\times}$, forming part of one of the plates $c$. On the other side the arrangement is similar and the wedge-like projections $d^{\times}$ enter between combs upon the two plates $c\ c$. In either case, when the wedges are between the combs there is good metallic connection between the two plates $c$ $c$ of the pair and the transformer or set of transformers in connection with the two opposite pairs of plates is in operation. When, on the other hand, the arm $d$ is turned about the bar $b$, so as to withdraw the wedges from between the combs, the transformer or set of transformers is put out of use, there being then a gap or opening both in its primary and in its secondary circuit. The wedges $d'$ serve to make the primary connections and the wedges $d^{\times}$ the secondary or low-tension connections. The contacts are preferably so arranged that the primary and secondary circuits are opened as nearly simultaneously as possible.
$e\ e$ are heavy-armed levers, which are mounted on and able to turn about the bar $b$ to a certain extent independently of the arms $d\ d$. Each lever $e$ is formed with two cheeks or disks, and these are connected by four bolts $e'\ e'$, which are clothed with vulcanized india-rubber to strike softly on the parts with which they come into contact. On each lever, also, two small radially-set rollers $e^2\ e^2$ are mounted.

$f$ is a double wedge-piece mounted upon a carriage $f'$, which, by means hereinafter described, can be made to travel along the table in either direction. The double wedge $f$ as it passes each lever $e$ comes into contact with one or other of the rollers $e^2$ upon it. It raises the lever to a vertical position and causes it to pass somewhat beyond, and then the lever by its own weight falls suddenly over. As the lever falls the bolts $e'\ e'$ strike the arm $d$, and so the position of the arm is suddenly reversed. It is raised on one side and depressed on the other until it is brought to rest upon one or other of the stops $a^{\times}$ on the frame. When the wedge-piece $f$ travels from right to left, as seen in Figs. 1 and 2, it brings the levers which it passes to the position shown in Fig. 4—that is to say, it puts transformers into circuit. When, on the other hand, it travels from left to right, it takes out transformers. The carriage $f'$ is attached to an endless chain $g$, which passes around a chain-wheel $h$ at one end of the table and a pulley $i$ at the other end. There are also intermediate guide-pulleys. The wheel $h$ is free to turn upon an axis $k$, which is mounted in bearings on the frame.

$l$ is a cord attached to the chain on the under side and passing over a guide-pulley to the weight $m$. When the wheel $h$ is free, the pull of the weight upon the chain moves the carriage $f$ from right to left and transformers are put in. Except when this is required, the wheel $h$ is locked in the following manner to its axis $k$.

$n$ is a toothed wheel fast with the wheel $h$ and also free to turn upon $k$. $o$ is another toothed wheel fast upon the axis $k$.

$p\ p$ are two pinions fast on a spindle $p'$, carried in bearings at one end of a lever $q$, having its fulcrum on the frame at $q'$. At the other end of the lever there is a weight $q^2$. This holds the pinions in gear with the wheels $n$ and $o$. The wheel $h$, when so locked, can only turn when the axis $k$ also revolves; but this axis is usually held fast by a brake-wheel $r$ upon it and a strap made to bear upon the periphery of the wheel by a weight $r'$.

$s$ is an electro-magnet, which when a current passes in its coils attracts the armature $s'$, attached to the lever $q$. The pinions $p\ p$ are then drawn down until the wheel $n$ is out of gear, and the weight $m$ then operates to put in transformers until it is stopped by the pinions $p$ again rising. The teeth of the wheel $o$ are sufficiently long not to disengage.

$t$ is a drum fast on the axis $k$. It has a rope $t'$ wound around it. The rope passes over an overhead pulley, and a heavy weight, competent not only to work the switches but also to lift the weight $m$, is attached to it. When the brake-wheel $r$ is relieved from the pressure of the brake-strap upon it, the rope $t'$ is drawn off from the drum $t$ and the axis $k$ revolves. If the pinions $p$ are in gear, (but not otherwise,) the wheel $h$ also will turn and the carriage $f$ will be drawn from left to right and tranformers will be taken out of circuit. At the same time the weight $m$ will be raised.

The release of the brake-wheel $r$ is effected by the electro-magnet $u$. When a current passes in the coils of this magnet, it attracts its armature $u'$, and this being attached to the lever $v$ the lever is lifted, and so, also, are the weights $r'$, which are immediately over the end of the lever.

The magnets $s$ and $u$ may be supplied with current to energize them in various ways. One way is illustrated schematically by Fig. 9. $w$ is an electro-magnet in the secondary circuit of that transformer which remains always at work. It has two armatures carried on levers $w'$ $w^2$, which at their farther ends are provided with points dipping down into mercury-cups and then electrically connecting the contents of these cups. When the current through the transformer which remains permanently in circuit and in the coils of the magnet $w$ is neither too large nor too small, the magnet $w$ is able to hold up the lever $w'$, but is unable to raise the counterweight $w^\times$, attached to the lever $w^2$. Consequently both pairs of points stand out of the mercury-cups. Circuit-wires pass from the cups, as shown, to the magnets $s$ and $u$, (which are the same as the magnets similarly lettered in the preceding figures,) and these wires are continued to the central station. At the central station the wires are connected with any convenient lamp-circuit, the connections being through resistance or choking coils $xx$, to moderate the current which passes when first the points dip into either pair of cups.

$y$ $y$ are two bells of different tone included in the circuits. When the points of either of the levers $w'$ or $w^2$ dip into the mercury, the corresponding bell rings, showing that the current in the magnet $w$ and in the transformer-circuit in which the magnet is included is too large or too small, as the case may be. An indicator may also be provided at $y'$ to give the same information visibly.

$z'$ and $z^2$ are switch-levers. The attendant on hearing the call closes the corresponding switch, short-circuiting the coil $x$, and a more powerful current then passes, which energizes the magnets $s$ or $u$, as the case may be. It is advisable that the switch-levers $z'$ and $z^2$ should be connected, so that the switch $z^2$ may always be closed when $z'$ is closed, although $z^2$ may be closed independently of $z'$. This arrangement forms an additional precaution against too many transformers being put out of work. If it be thought expedient to dispense with the control of the attendant at the central station, it may be so arranged that the dipping of the points on the levers $w'$ $w^2$ shall at once transmit a current to energize the magnets $u$ and $s$. In this case it will be unnecessary to lead circuit-wires from the magnets to the central station.

In place of mercury-cups other forms of contacts may be employed.

Fig. 9 illustrates, also, the arrangement of the transformers in groups increasing in geometric progression.

The apparatus above described affords very complete precaution against transformers being taken out or left out of circuit when they should be in use. The motor mechanism cannot take transformers out of circuit unless the magnets $u$ and $s$ conspire to permit it, and then it cannot do so without storing up power in the weight $m$ in readiness to put transformers again into circuit. A current passing in the coils of the magnet $s$ will always cause transformers which may be out of circuit to be put in, whatever be the state of the magnet $u$, and whether the motor mechanism is in efficient operation or otherwise.

It may occasionally happen that the rocking arms $d$ $d$, already referred to, form imperfect contacts with the plates $c$. Dust or dirt between the contact-surfaces may cause this, and heating and injury to the apparatus might result. It is necessary to guard against this danger. I do this by providing on each of the plates $c$ a socket $c'$, and I connect the sockets of each pair of plates by an instrument, of which the construction is shown by Figs. 7 and 8. This instrument is made for the most part of vulcanized fiber and it has a wooden handle. On its under side are two hollow metal plugs $A'$ $A^2$, adapted to fit into the pair of sockets $c'$ $c'$. Each plug has a lining $A$ of paraffine wax within it, formed by melting paraffine in the plug, cooling the plug externally until its walls are coated to a sufficient thickness, and then pouring out the still fluid residue. The plug so prepared is partly filled with mercury, and it is secured in its place upon the vulcanized-fiber support by bolts B B, which also serve to electrically connect it with one or other of the metal plates $C'$ $C^2$, the plug $A'$ being connected with the plate $C'$ and the plug $A^2$ with the plate $C^2$. The plate $C'$ is also electrically connected with the pin $D'$ and the plate $C^2$ with the pin $D^2$. The pin $D'$ dips into the mercury within the plug $A^2$ and the pin $D^2$ into that in the plug $A'$. The plugs $A'$ $A^2$ are therefore effectually insulated from each other when cold. When, however, either of the plates $c$ becomes heated in consequence of an imperfect contact made by the arm $d$, the heat is communicated to one or both of the plugs $A'$ $A^2$ and the paraffine melts. The mercury is then in contact with both the plug and the pin and the current then passes freely from plug to plug. An effectual connection is thus made; but the contact so made remains until the machine is inspected. This appliance will also be found useful in other cases where heatings from imperfect contacts are liable to occur.

In the apparatus shown by the drawings, the motor mechanism which takes the transformers out of circuit is wheelwork actuated by a heavy weight attached to the rope $t'$; but it might be an electromotor operating to turn the axis $k$ and supplied with current for this purpose when the electro-magnet $u$ receives its current, or other motors may be employed; but whatever the motor it always when taking out transformers also lifts the weight $m$ or its equivalent, as above described, so that although the motor may run down or cease to work from any cause there is always power available to put all the transformers into circuit when called for, and no injury to or burning up of the transformers can then result.

What I claim is—

1. In an electrical distribution system, the combination of an electric circuit, transformers adapted to have their primaries connected with or disconnected from said circuit, their secondary circuits independent of said electric circuit, a motor mechanism driven by a power independent of variations of electrical condition in said secondary circuits, contacts and circuit connections whereby when said motor is actuated by its driving-power one or more of said transformers are disconnected from said circuit, means for storing power from said motor mechanism when thus operated, and subsequently applying such stored power to re-establish the connection of the primary circuit of said transformer or transformers with said circuit.

2. In apparatus for throwing transformers or other units of electrical apparatus into and out of circuit, the combination of a power-driven-motor mechanism controlled by variations of the load on said circuit, electro-magnetic means operated upon a decrease in the load on said circuit that permit the actuation of said motor, transformers and their contacts and connections, whereby on such actuation of the motor one or more transformers are thrown out of circuit, means for storing power from the motor while it is thus operating to throw one or more transformers out of circuit, and electro-magnetic means controlling such stored power operated by an increase of load on the circuit, whereby the stored power is then applied to effect the throwing of one or more transformers into circuit.

3. In apparatus for throwing transformers or other units of electrical apparatus into and out of circuit, the combination of transformers and their contacts and circuit connections, whereby they are connected in or disconnected out of circuit, switch mechanism controlling said contacts or connections, a power-driven motor that operates said switch mechanism, controlling devices operated by a decrease of the load on the circuit that then effect the actuation of said switch devices by the motor to throw one or more transformers out of circuit, means for storing power from the motor while thus operating, means whereby such stored power may be applied to said switch mechanism to throw one or more transformers into circuit, and means controlled by an increase of load on the circuit for then effecting such application of the stored power.

4. In apparatus for throwing transformers or other units of electrical apparatus into and out of circuit, the combination of the transformers, their switch devices, a motor-shaft, connecting mechanism between the shaft and switch devices whereby transformers may be thrown out of circuit by the actuation of the shaft, electro-magnetic devices for disconnecting the connecting mechanism from the shaft, and means for then operating said mechanism in a reverse direction to throw transformers into circuit, substantially as set forth.

5. In apparatus for throwing transformers or other units of electrical apparatus into and out of circuit, the combination of the transformers, their switch devices, a motor-shaft, connecting mechanism between the shaft and switch devices whereby transformers may be thrown out of circuit by the actuation of the shaft, a weight connected with the connecting mechanism that is then raised by the power from the shaft, and electro-magnetic devices for disconnecting the connecting mechanism from the shaft, whereupon the weight operates to move the connecting mechanism in a reverse direction to throw transformers into circuit, substantially as set forth.

6. In apparatus for connecting and disconnecting transformers or other electrical units, the combination of parts consisting of the contact-arms $d$ and contact parts in connection therewith, the weighted rocking levers $e$, operating upon the arms to close and open the contacts, and the wedge-piece $f$ and its carriage $f'$, which in traversing causes the levers $e$ to fall over from side to side, substantially as described.

7. In apparatus for connecting and disconnecting transformers or other electrical units, the combination of parts consisting of the axis $k$, motor mechanism for rotating the axis $k$, electrical mechanism for starting and stopping the rotation of the axis $k$, the chain-wheel $h$, electrical mechanism putting the chain-wheel into and out of gear with the axis $k$, the endless chain $g$, and the wedge $f$, moved by the chain $g$ and operating the switches, substantially as described.

8. In apparatus for connecting and disconnecting transformers and other electrical units, the combination, with the transformer contact-plates having sockets thereon, of a conducting bridge-piece having hollow metal plugs that fit in said sockets, the plugs being lined with paraffine or like material containing mercury and having each a conducting-pin dipping into the mercury, substantially as set forth.

9. In apparatus for connecting and disconnecting transformers, the combination of a transformer, its terminal contacts, a rocking lever carrying contact parts for both the primary and secondary circuits of the transformer, a second gravity-lever normally disconnected from the contact-lever and adapted when moved past its center to fall against and operate it, and means for moving the gravity-lever to either side of its pivot, whereby when it falls upon the contact-lever the primary and secondary circuits of the transformer are simultaneously opened or closed.

THOMAS TOMLINSON.

Witnesses:
 JOHN H. WHITEHEAD,
  24 *Southampton Buildings, London.*
 JOSEPH LAKE,
  17 *Gracechurch Street, London, E. C.*